United States Patent Office 3,200,631
Patented Aug. 17, 1965

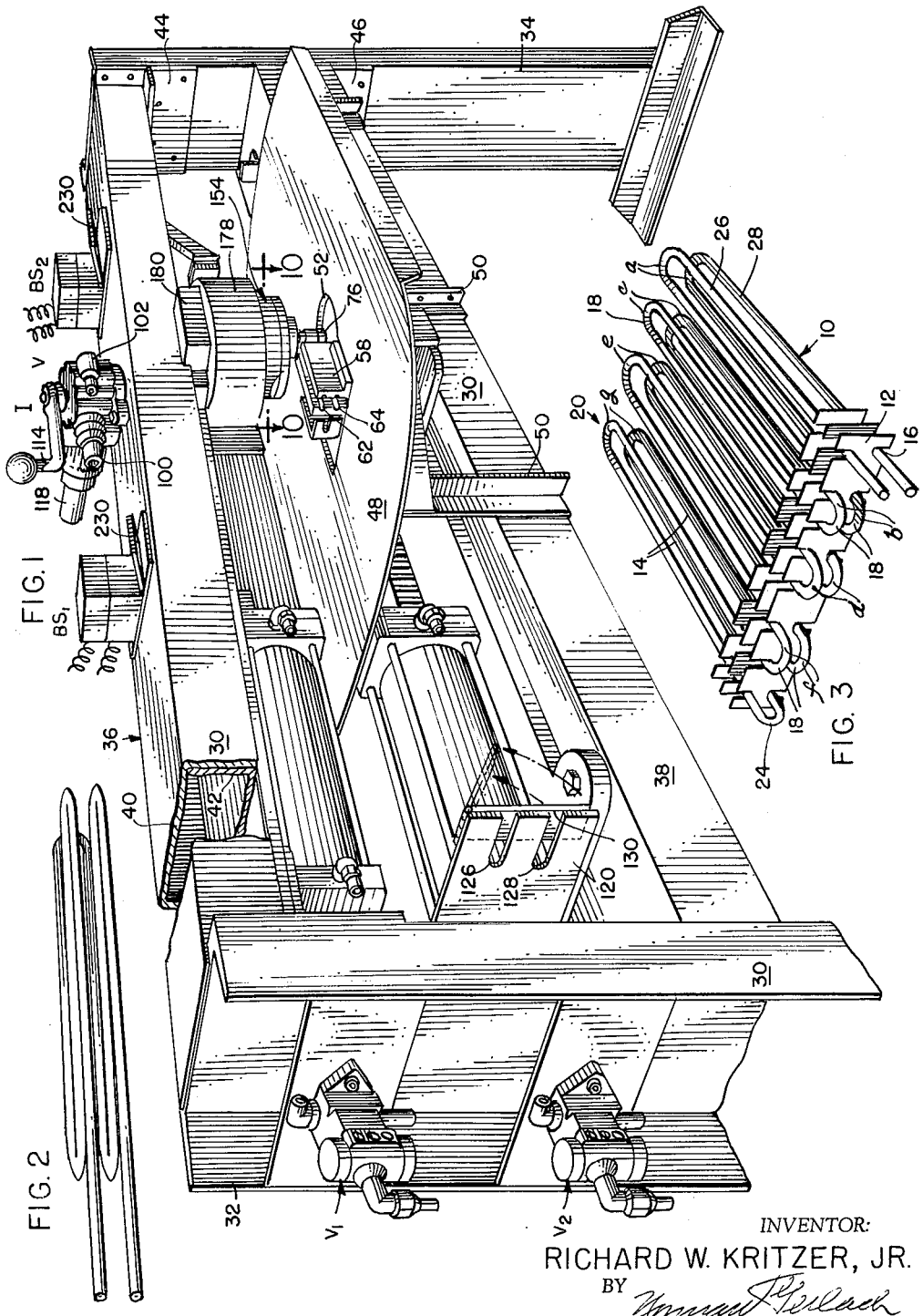

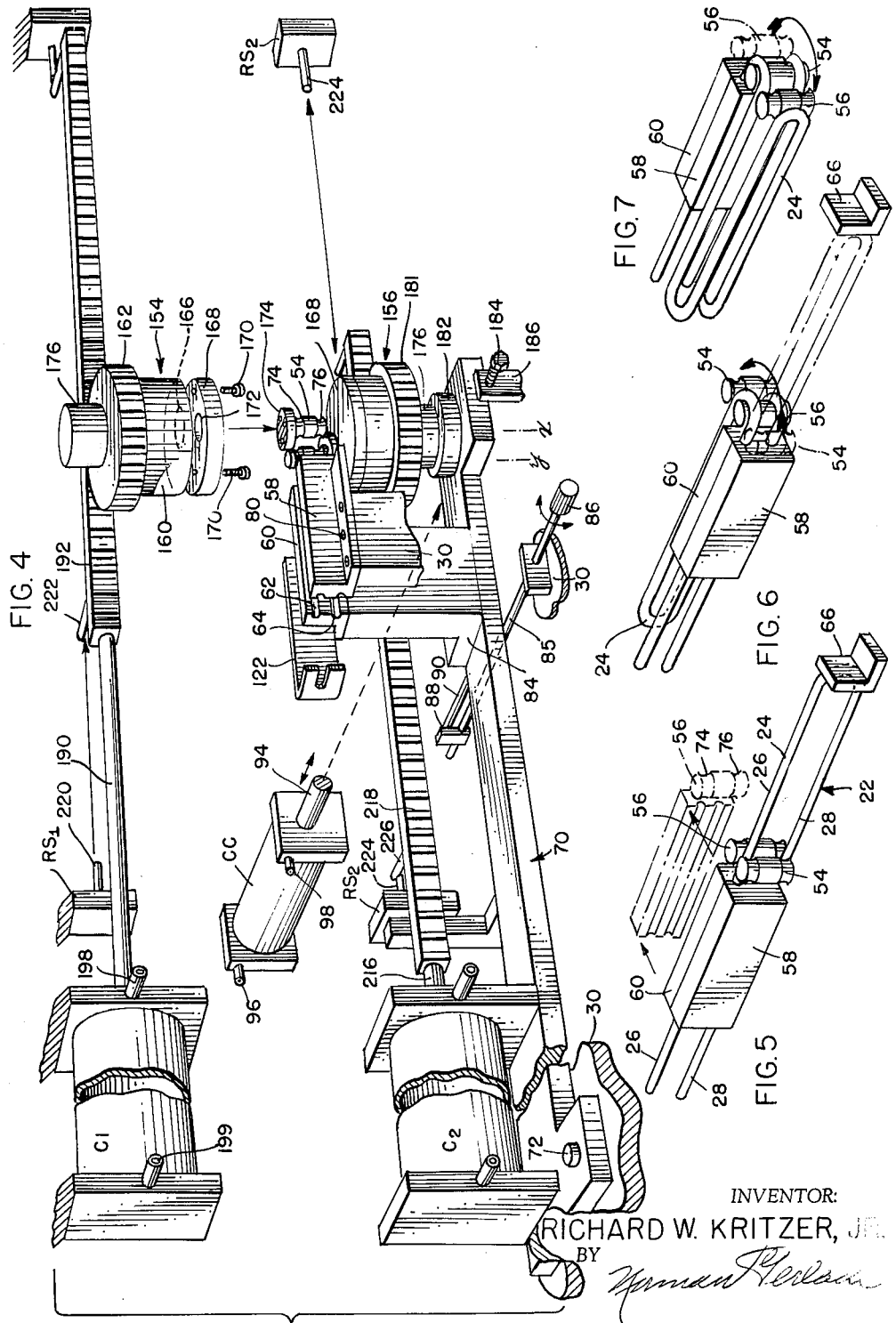

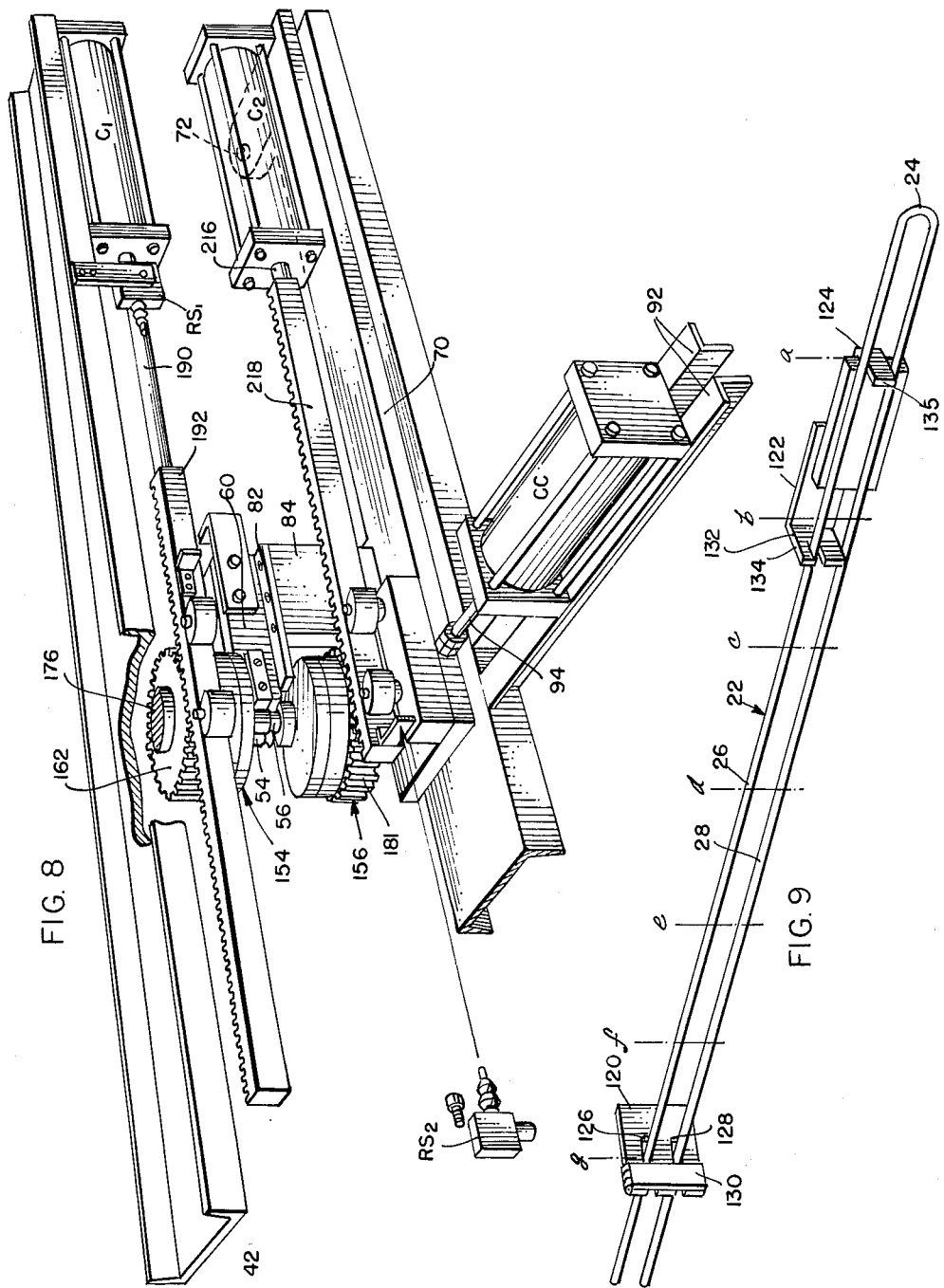

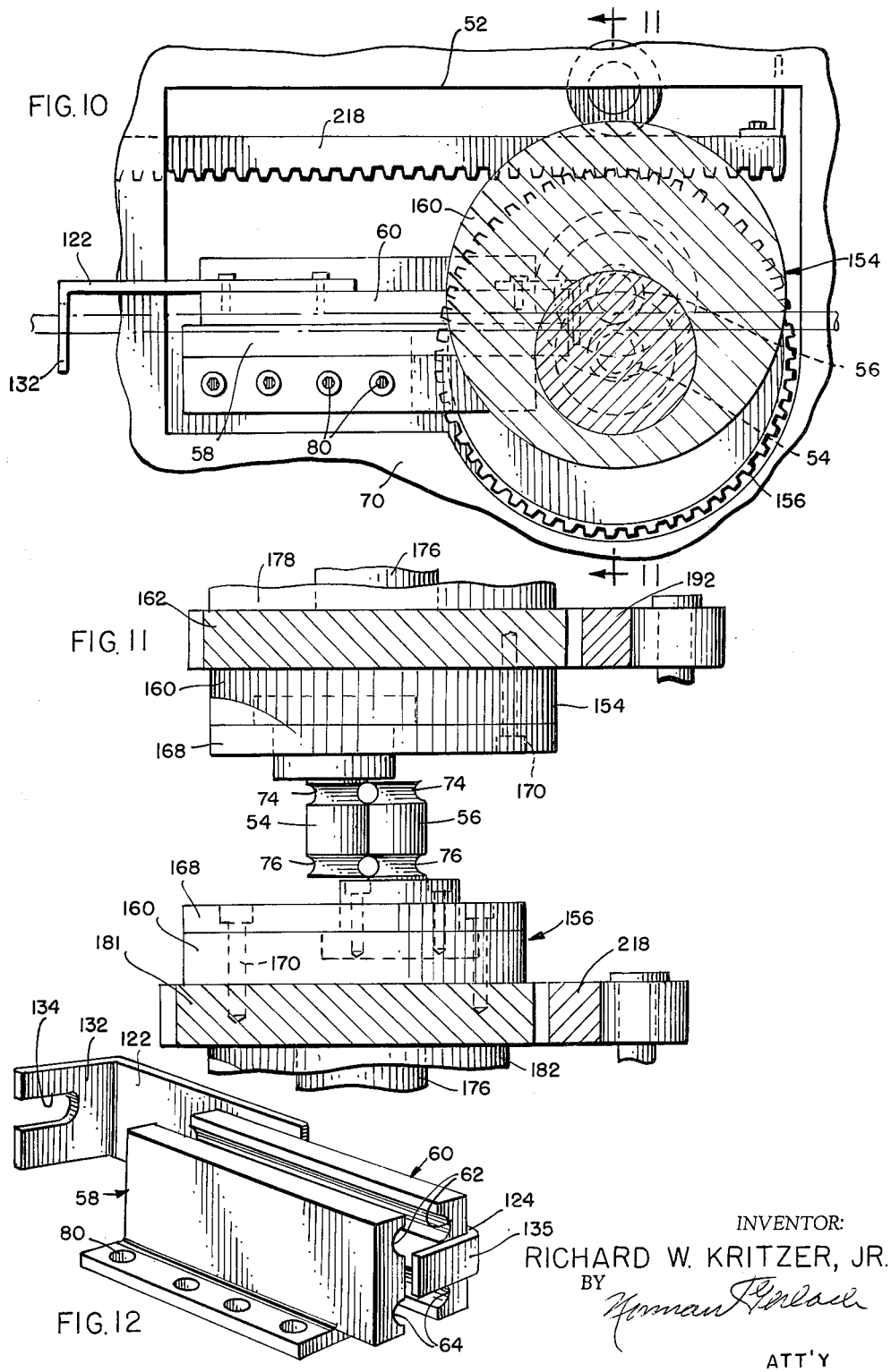

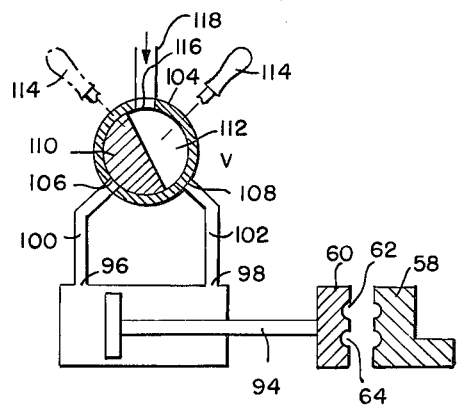
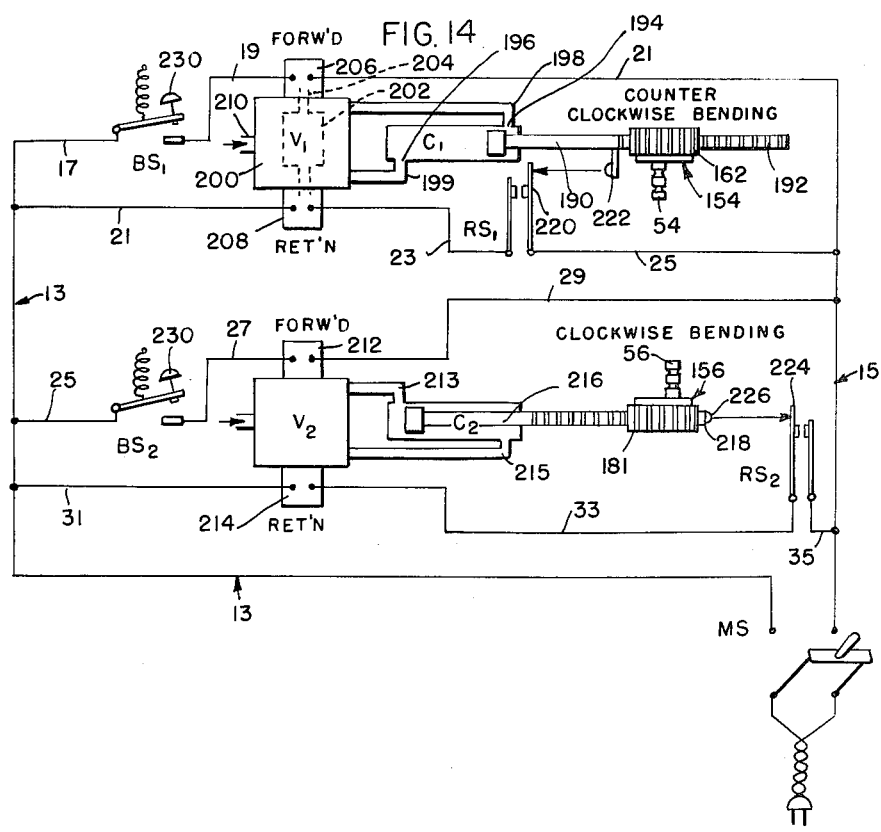

3,200,631
APPARATUS FOR EFFECTING REVERSE BENDS IN DUAL HEAT EXCHANGE TUBING
Richard W. Kritzer, Jr., Chicago, Ill., assignor to Peerless of America, Inc., Chicago, Ill., a corporation of Illinois
Filed Aug. 6, 1962, Ser. No. 214,972
8 Claims. (Cl. 72—306)

The present invention relates to an apparatus for effecting reverse bends in dual heat exchange tubing. Dual heat exchange tubing of the type with which the present invention is concerned consists of a single length of tubing which is usually of appreciable extent and is initially bent medially of its ends to provide a relatively sharp 180° reverse bend, thus bringing the resultant elongated straight tube lengths into a position of close parallelism so that the tubing as a whole resembles an extremely deep and narrow hairpin-like structure. Such dual heat exchange tubing is employed as base tubing stock in the formation of a tubing core for a heat exchange unit of the finned tubing type. Dual and parallel reverse bends are created in the elongated straight parallel closely spaced tube lengths, the initial bend being effected in one direction, the second bend being effected in the opposite direction, the third bend being effected in the direction of the initial bend, and so on, until the straight tubing lengths are consumed and the resultant tubing core consists of two serpentine sections of tubing which are parallel throughout, are closely spaced and are connected together at one end by the single reverse bend which was created in the originally straight length of tubing to effect the dual tubing stock.

Heretofore it has been customary to effect the successive oppositely directed reverse bends in the straight tube lengths of the dual tubing by manually bending such tube lengths around a vertical mandrel which projects upwards from a table or other working surface. The tubing as a whole is slid longitudinally along the table and alongside the mandrel to the desired bending region and then is wrapped about the mandrel throughout 180° in one direction. Thereafter, the tubing is lifted over the mandrel so as to enable it to pass along the other side thereof, is then slid to a new bending position, and thereafter, is wrapped about the mandrel in the opposite direction. When bending a single tubing length into serpentine configuration in this manner, a simpler procedure may be followed and the tubing may be left on the same side of the mandrel for each successive bend, it being necessary merely to rotate the tubing 180° about its longitudinal axis after each bend is made so that, as the serpentine structure is progressively formed, it is swung from side to side and the oncoming straight tube length need at no time leave the table surface on which it is supported. Where dual tubing is concerned, such side-to-side swinging of the tubing cannot be effected as the upper of the two straight tube lengths cannot be made to clear the mandrel for lateral swinging purposes and it is necessary for the operator to lift the entire length of tubing, or substantially the entire length, bodily for alternate placement on opposite side of the mandrel. This procedure is tedious, exacting, and requires both strength and skill on the part of the operator if accurate tubing cores are to be produced.

The present invention is designed to overcome the above-noted limitation that is attendant upon the fabrication of a tubing core from dual heat exchange tubing, and toward this end, it contemplates the provision of an apparatus embodying a pair of mandrels, each mandrel being movable around the other mandrel through an orbital path of 180°, together with means for selectively moving the mandrels so that either mandrel may serve as a fixed bending anvil while the other mandrel serves, in combination with such fixed anvil, as a tubing-impelling wrap-around rolling die for causing the two parallel tubing lengths simultaneously to become wrapped around the fixed anvil. By such an arrangement, the tubing and mandrels may be so manipulated that an initial dual bend effected in the dual tubing at one region therealong may be followed by a similar but reversely directed bend at another region along the tubing, with successive dual bends being repeatedly effected in this manner until the required number of reverse bends have been made and the required number of straight reach sections are provided in the resultant serpentine tubing core.

The provision of a dual tubing bending apparatus of the character briefly outlined above being among the principal objects of the invention, it is a further object to provide such an apparatus wherein a certain degree of automation is involved, which is to say, that the apparatus is cyclic and semi-automatic in its operation so that the number of manual operations required to be performed by the operator of the machine in connection with reverse back and forth bending of the tubing are reduced to a minimum.

Another and more specific object of the invention is to provide a bending apparatus of the aforementioned character and wherein after each mandrel has been caused to move in its orbital path about the other mandrel during effective tubing bending operations, the mandrel which has been so moved will automatically be restored to its intial position so that the operator may not, by initiating motion of the other mandrel, cause jamming of the apparatus with consequent damage to the mandrels, to their operating instrumentalities, or to the dual heat exchange tubing undergoing bending.

A further object of the invention is to provide an apparatus which is designed expressly for forming reverse bends in dual heat exchange tubing and has associated therewith novel means for clamping the dual tubing during each bending operation and for releasing the tubing after the bend has been effected so that the tubing, as a whole, may be slid to a new position with respect to the mandrels and again clamped in position.

A still further object of the invention is to provide in connection with a bending apparatus of the aforementioned character, a novel tubing alignment means whereby the tubing is at all times, during the manufacture of any given tubing core, maintained in accurate register with both the clamping means and the mandrels so that, when these instrumentalities are brought into operative engagement with the tubing, there will be no binding or pinching of the tubing.

Other objects of the invention and the various advantages and characteristics of the present bending apparatus will be apparent from a consideration of the following detailed description.

With the foregoing and other objects in view, the invention consists in the novel construction, combination and arrangement of parts shown in the accompanying five sheets of drawings forming a part of this specification.

In these drawings:

FIG. 1 is a fragmentary perspective view of a tube bending apparatus embodying the present invention;

FIG. 2 is a fragmentary perspective view of a length of dual heat exchange tubing in the process of being bent to serpentine form by the apparatus of FIG. 1, two reentrant or reverse bends having been effected therein;

FIG. 3 is a fragmentary perspective view of a heat exchange unit embodying a dual heat exchange tubing core which has been bent to form by the apparatus of FIG. 1;

FIG. 4 is an enlarged fragmentary exploded perspecspective view of the tube bending mandrels which are employed in connection with the present invention and form operating parts of the bending apparatus, with the immediate operating instrumentalities for the mandrels also being shown;

FIG. 5 is a fragmentary perspective view of the two cooperating tube-clamping blocks which are employed in connection with the present invention, such view showing the relationship of the blocks with respect to the tube bending mandrels prior to effecting an initial bend in a length of dual tubing;

FIG. 6 is a fragmentary perspective view similar to FIG. 5, but showing the positions of the mandrels after the initial reentrant bend has been effected;

FIG. 7 is a fragmentary perspective view similar to FIGS. 5 and 6 but showing the positions of the mandrels after the second reentrant bend has been effected;

FIG. 8 is an enlarged fragmentary rear perspective view of the structure which is shown in FIG. 4;

FIG. 9 is a fragmentary perspective view of a length of dual heat exchange tubing prior to bending operations and showing certain tube aligning instrumentalities whereby the tubing is maintained in accurate alignment with the tube-clamping blocks;

FIG. 10 is an enlarged horizontal sectional view taken on the line 10—10 of FIG. 1 and in the direction indicated by the arrows;

FIG. 11 is a sectional view taken on the line 11—11 of FIG. 10;

FIG. 12 is an enlarged perspective view of the tubeclamping blocks of the present bending apparatus;

FIG. 13 is a schematic view of a local hydraulic circuit employed in connection with the apparatus; and FIG. 14 is a combined electrical and hydraulic circuit diagram of the control means for actuating the tubeclamping blocks and the tube-bending mandrels.

GENERAL DESCRIPTION OF APPARATUS

Referring now to the drawings, and in particular to FIG. 1, a bending apparatus embodying the present invention has been fragmentarily illustrated. The specific purpose of the apparatus is to effect bending of a length of dual heat exchange tubing (see FIG. 9) into serpentine configuration as shown in FIG. 2 by effecting in the parallel straight tube lengths of the dual tubing successive reverse bends, that is, bends which alternate in clockwise and counterclockwise directions. The apparatus is capable of effecting such directional or reverse bends in the dual tubing indefinitely until the entire length of tubing is consumed or used up. The apparatus is specifically designed to effect the formation of a serpentine tubing core such as the tubing core which is designated by the reference numeral 10 in FIG. 3. The core 10 is adapted to have assembled thereon a series of closelyspaced, parallel, flat strips 12 of standard or conventional fin stock, the straight reach sections 14 of the tubing being pressed into notches 16 in the edges of the strips, and the reverse bends 18 of the tubing being disposed outside the cluster or series of fin-forming strips 12. The assembled tubing and fin strips constitute the complete heat exchange unit 20 of FIG. 3. This heat exchange unit 20 is of conventional design and no claim is made herein to any novelty associated with it. Heretofore, units of this character have been made by manual tube bending and tube and fin strip assembly operations which are wellknown in the art, and as previously outlined, the difficulties which have heretofore presented themselves in creating a series of alternately directed reverse bends in a length of dual heat exchange tubing have given rise to the present invention.

In fashioning a tubing core, such, for example, as the core 10 of FIG. 3, it is expedient to use dual tubing of the type shown in FIGS. 5 and 9 and designated by the reference numeral 22. While it is possible to make such a core from a length of single tubing, the creation of parallel bends in the straight tube lengths of dual heat exchange tubing simultaneously on a dual bending mandrel arrangement leads to uniformity of the finished core and to a reduction in the over-all number of involved bending operations. The term "dual tubing" as employed throughout this specification and in the appended claims refers to an elongated length of single tubing which has been provided with one reentrant bend 24 so as to produce two elongated, parallel, closely-spaced, straight, equal tube lengths 26 and 28. The longitudinal extent of the tube lengths 26 and 28 is determined by the number of tube bends which are required to produce the tubing core 10 and by the distance between adjacent tube bends. The tubing core which has been selected for illustration herein (see FIG. 3) contains seven tubing bends, each bend involving two individual parallel tube bends. These tubing bends have been labelled a, b, c, d, e, f, and g in FIG. 3 and have been marked-off from right to left in FIG. 9. The use of dual tubing is not novel and the present apparatus merely effects automatically the bending of such tubing and obviates the tubing handling difficulties which are involved in connection with conventional tube bending methods utilizing such dual tubing.

THE APPARATUS FRAMEWORK

Referring now to FIGS. 1 and 4, the tube bending apparatus of the present invention involves in its general organization a stationary framework 30 of horizontally elongated design and only the salient parts of which have been illustrated herein. This framework 30 includes a pair of widely-spaced, upright, vertical end standards 32 and 34 which are channel-shaped in cross section and are connected together by a horizontal upper level support 36 and a horizontal underlying intermediate level support 38. The upper level support 36 is comprised of outer and inner nested channel-shaped members 40 and 42, the support being carried at its ends on shelf brackets 44 which are secured to the upper ends of the standards 32 and 34, respectively. The intermediate level support 38 is of similar nested channel construction and is supported at the ends thereof on shelf brackets 46.

The intermediate level support 38 has associated therewith a flat horizontal plate metal table 48 which is carried on vertical angle bar supports 50. The table 48 is provided with a central opening 52, such opening establishing a tubing bending station. The table as a whole establishes a working area for the apparatus operator who is required to perform certain manual functions or operations in connection with tubing feed operations. Accordingly, two cooperating tube bending mandrels 54 and 56 project through the opening 52 and function as hereinafter described in detail to effect bends alternately in opposite directions in the length of dual tubing 22 (see FIG. 9) as the latter is fed over the table 48 to the mandrels. Two clamping blocks 58 and 60 project through the opening 52 and extend thereabove. They are effective at a predetermined time in the apparatus cycle to hold the tubing 22 in position for bending operations on the mandrels 54 and 56.

DESCRIPTION OF APPARATUS FUNCTIONS

For a preliminary understanding of the invention, reference may be had to FIGS. 5, 6 and 7 wherein the operation of the tubing bending mandrels 54 and 56 and of the clamping blocks 58 and 60 is somewhat schematically illustrated. The clamping block 58 is a fixed block, whereas the block 60 is movable laterally in a horizontal path. The block 60 is capable of moving toward and away from the block 58 in order, first, to clamp the tubing 22 between the two blocks and, then, to release the tubing from the blocks. The blocks 58 and 60 are formed with cooperating opposed clamping surfaces and have formed therein registering upper clamping grooves 62 and registering lower clamping grooves 64 for respectively engaging the upper and lower tube lengths 26 and 28 therebetween when the clamping blocks are closed upon each other. When the blocks are in their position of release, the tubing 22 may be slid forwardly into engagement with a fixed abutment 66. The position of the abutment 66 determines the extent of the straight reach sections 14 between successive tube bends 18 (see FIG. 3).

For convenience of description herein, the term "tubing" refers to the dual length tubing 22 as a whole and, consequently, the term "tubing bend" will refer to composite bends which are simultaneously made in both tube lengths 26 and 28. The term "tube" refers to either tube length 26 or 28 and, consequently, the term "tube bend" will refer to an individual bend in either of these tube lengths. This terminology will be adhered to insofar as practicable in the interests of uniformity of description, but in certain instances, the terms "tubing" and "tube," or the terms "tubing bend" or "tube bend," are applicable interchangeably.

Still referring to FIGS. 5, 6 and 7, the two mandrels 54 and 56 are positioned in side-by-side relationship with their axes extending vertically and in parallelism. The mandrel 54 is capable of 180° orbital swinging movement about the mandrel 56 to effect a tubing bend in a counterclockwise direction as viewed from above in FIGS. 5 and 6, while the mandrel 56 is capable of orbital swinging movement about the mandrel 54 to effect a tubing bend in a clockwise direction as viewed from above in FIG. 7. As will be described in greater detail hereafter, after either mandrel has completed an orbital swing to effect a tubing bend, means are provided for automatically restoring the mandrel to its original position so that there will be no danger of the operator of the apparatus initiating simultaneous movements of both mandrels and thereby effecting a jamming of apparatus parts with consequent danger of damage to the mandrels or their associated operating instrumentalities.

The apparatus is semi-automatic in its operation although automation is fairly complete. The only operations which are required of the operator of the apparatus ar initiation by electrical means of each tubing bend that is performed, initiation by pneumatic means of the opening and closing movements of the tubing clamping blocks 58 and 60, and a manual feeding of the tubing against the abutment 66 to measure the correct length of the reach sections 14 (see FIG. 3) between successive tubing bends 18.

The clamping block 60 and the mandrel 56 are movable bodily as a unit toward and away from the clamping block 58 and the mandrel 54 in order to grip the tubing 22 during tube-bending operations and release the tubing between such operations. These movable instrumentalities (60, 56) are operatively mounted upon a carriage in the form of a long swinging arm 70 (see FIG. 4) which is connected pivotally by a vertical pivot pin 72 to a stationary part of the apparatus framework 30.

The apparatus is cyclic in its operation and also subject to the controls and manipulations which are required of the operator as outlined above, and at the commencement of any given apparatus cycle, the mandrels 54 and 56 will assume the side-by-side position in which they are shown in FIG. 5. The two mandrels are provided with upper and lower registering annular grooves 74 and 76 which, when the mandrels are contiguous, define therebetween tube-receiving voids, the upper void accommodating passage therethrough of the upper tube length 26 and the lower void accommodating passage therethrough of the lower tube length 28. For purposes of discussion herein, an apparatus cycle may be considered as embodying such apparatus movements as take place between successive tubing bends, and including a restoration of the parts to their respective normal positions after each tubing bend. Therefore, to produce any given tubing core, for example, the tubing core 10 of FIG. 3, the number of involved apparatus cycles will correspond to the number of tubing bends which are made in the tubing 22.

The first tubing bend is made by first moving the clamping block 60 and the mandrel 56 away from the clamping block 58 and the mandrel 54 as shown in dotted lines in FIG. 5 so as to afford a clearance for introduction of the upper and lower tube lengths 26 and 28 between the clamping blocks and mandrels with the tube lengths being disposed in horizontal register with the upper and lower grooves 62 and 64 and with the upper and lower grooves 74 and 76, respectively. Thereafter, the arm 70 is swung in such a manner that the grooves of the various pairs close upon each other so that the parts assume the full-line position of FIG. 5, the tubing 22 having initially been slid longitudinally over the table 48 so that the forward end of the tubing engages the abutment 66.

The first bend (g) is effected by causing the mandrel 54 to orbit throughout an arc of approximately 180° about the mandrel 56 as indicated by the curved arrow in FIG. 6. This results in the portion of the tubing 22 that is forwards of the two mandrels swinging through an arc or angle of 180° in a counterclockwise direction (as viewed from above) with the mandrel 54 wrapping the adjacent portions of the tubing, so to speak, around the mandrel 56. At the end of the swinging movement, the tubing assumes the position in which it is shown in full lines in FIG. 6. Immediately after such wrapping operation, the mandrel 54 is caused to swing or orbit in a reverse (clockwise) direction and is restored to the dotted-line position of FIG. 6, leaving the tubing partially wrapped about the mandrel 56.

The next apparatus cycle is commenced by again moving the block 60 and the mandrel 56 away from the block 58 and the mandrel 54 in order that the partially-formed tubing may be manually slid forwardly until the initial tubing bend engages the abutment 66, as shown in dotted lines in FIG. 6. Thereafter, the block 60 and the mandrel 56 are restored to their tubing clamping positions against the block 58 and the mandrel 54, respectively. The mandrel 56 is then caused to orbit or swing about the mandrel 54 in a clockwise direction, as indicated by the curved arrow in FIG. 7, thus swinging the portion of the tubing that is forwards of the two mandrels and includes the previously-formed tubing bend throughout an angle of 180° so that the worked-upon portion of the tubing assumes the full-line position wherein it is shown in FIG. 7. Immediately thereafter, the mandrel 56 is caused to orbit in a reverse or counterclockwise direction about the mandrel 54 to restore it to the dotted-line position as shown in FIG. 7.

The tubing 22 is now provided with two reentrant or reverse bends and the additional bends that are required to make up the tubing core 10 of FIG. 3 are effected by operating the apparatus through additional cycles, each successive tubing bend resulting in the 180° swinging movement of a following or successive length of the dual tubing stock with less of the stock remaining on the table 48 for feed purposes. It is to be noted at this point that successive cycles differ only as to which mandrel performs an orbiting operation about the other mandrel. In the manufacture of the exemplary tubing core 10 of FIG. 3 involving seven apparatus cycles, the first third, fifth and seventh apparatus cycles involve an orbiting of the mandrel 54, whereas the second, fourth and sixth cycles involve an orbiting of the mandrel 56.

THE TUBING CLAMPING MECHANISM

The clamping block mountings

The tubing clamping mechanism which includes the previously mentioned grooved clamping blocks 58 and 60 is best illustrated in FIGS. 4, 8, 10 and 12. The clamping block 58 is bolted or otherwise secured as at 80 to a stationary part of the apparatus framework 30, whereas the block 60 is fixedly connected by bolts 82 to an upstanding support 84 (see FIG. 8) on the swinging arm 70. The arm 70 is capable of being swung between a fully retracted position wherein the clamping block 60 is relatively widely separated from the fixed clamping block 58, and an advanced or clamping position wherein the two blocks are in contiguity with their tube clamping grooves 62 and 64 in horizontal register. The widely spaced position of the blocks affords ample room for initial insertion of the tubing therebetween prior to commencement of the first apparatus cycle. After the first apparatus cycle has been initiated, there no longer is need for such a wide separation of the two clamping blocks 58 and 60 since, during the succeeding apparatus cycles in the production of the tubing core 10, these blocks need be separated only a distance sufficient to release the grip on the tubing and permit longitudinal manual sliding thereof forwardly against the abutment 66 as previously described. Therefore, means are provided for limiting at will the extent of swinging movement of the arm 70 so that during the apparatus cycles subsequent to the first cycle, the clamping blocks 58 and 60 may move only a slight distance apart. Accordingly, and as shown only in FIG. 4, a rotatable rod 85 with a manipulating knob 86 thereon is rotatably disposed in a stationary part of the framework 30 and carries a fixed radially extending abutment 88. The latter is designed for selective rotative movement into and out of the path of motion of a finger 90 on the arm 70. When the abutment 88 is disposed in the path of movement of the finger, the extent of swinging movement of the arm 70 is limited to a degree wherein the blocks 58 and 60 are only slightly separated. When the abutment 88 is in its full-line position as shown in FIG. 4, the arm 70 may swing to a position which will maintain the blocks 58 and 60 widely separated.

The clamping block actuating mechanism

Movement of the clamping block 60 toward and away from the fixed clamping block 58 is controlled and effected by a pneumatic cylinder CC (see FIGS. 4 and 8). Such cylinder is hereinafter referred to as the "clamping cylinder," and is mounted on a pair of side-by-side, horizontally disposed, angle pieces 92. The latter are fixedly connected to the intermediate level support 38 and extend at right angles thereto. The cylinder CC is provided with an extensible and retractible plunger 94, the distal or outer end of which is secured to the swinging arm 70. In addition, the cylinder CC is provided with fluid ports 96 and 98 which are connected by fluid lines 100 and 102 (see FIG. 13) to a manually operable control valve V (see FIG. 1). By means of this valve, fluid, i.e., air under pressure, is admitted selectively to the opposite ends of the cylinder CC in order to extend or retract the plunger 94. The valve V is provided with a valve casing 104 having formed therein ports 106 and 108 in communication with the fluid lines 100 and 102, respectively. Within the casing 104 is a body 110 which embodies a passage 112 and is rotatable under the control of an externally disposed operating handle 114. When the handle 114 is in the full-line position of FIG. 13, the passage 112 establishes communication between an air inlet port 116 in the casing 104 and the fluid line 102 with the result that the plunger 94 is caused to move to its retracted position thereby causing the clamping block 60 to move away from the clamping block 58. When the handle 114 of the valve V is swung into its dotted-line position as shown in FIG. 13, the passage 112 establishes communication between the air inlet port 116 and the fluid line 100 with the result that the plunger is extended and the two clamping blocks move into clamping engagement with the interposed tubing. The inlet port 116 is connected by a fluid line 118 to a source (not shown) of air under pressure.

The tube guides

Referring now to FIGS. 1, 4 and 9, in order (a) accurately to maintain the upper and lower parallel tube lengths 26 and 28 of the dual tubing 22 in respective register with the upper and lower tube-clamping grooves 62 and 64 of the clamping blocks 58 and 60 during separation of the clamping blocks, (b) to prevent transverse misalignment of the tube lengths during initial placement thereof between the blocks and possible consequent pinching of the tubes and damage thereto, and (c) to provide a guide for the tubing as it is shifted longitudinally along the table 48, three tube guides 120, 122 and 124 are provided along the path of forward feeding movement of the tubing.

The guide 120 is disposed at a region remote from the clamping blocks 58 and 60 and consists of a flat plate which is carried on the upright standard 32 and has formed therein inwardly directed, horizontal, open-ended slots 126 and 128 for reception of the upper and lower tube lengths 26 and 28, respectively. A hinged gate 130 is arranged so that it is capable of swinging from the full-line position shown in FIG. 1 wherein it effectively closes the open ends of the slots 126 and 128 for tube-retention purposes, to the dotted-line position wherein it allows the tubing to be inserted into and withdrawn from the slots by lateral tubing displacement.

The guide 122 is in the form of an L-shaped bracket. It is fixedly secured to the movable clamping block 60 and has a lateral leg 132. The latter is provided with a horizontal, open-ended slot 134 for reception of the upper tube length 26. The slot 134 is disposed at the horizontal level of the upper tube clamping grooves 62 in the two clamping blocks 58 and 60.

The guide 124 is in the form of a short L-shaped bracket and has a lateral leg 135 which projects between the upper and lower tube lengths 26 and 28 and is sufficiently close to the forward ends of the clamping blocks and at the level of the medial horizontal plane between the upper and lower grooves 62 and 64 so that the forward region of the tubing is maintained at the proper level for effective tubing engagement by the blocks 58 and 60.

THE MANDRELS AND THE ACTUATING MEANS THEREFOR

The previously mentioned mandrels 54 and 56 which have been heretofore referred to in connection with the schematic disclosures of FIGS. 5, 6 and 7 constitute elements of individual corner-type mandrel assemblies 154 and 156, respectively (see FIGS. 4 and 8). The two assemblies 154 and 156 are similar in their design and construction except reversed as to position. The assembly 156 is normally rotatable for tube-bending purposes bodily as a unit about a vertical axis, this axis being fixed with respect to the arm 70 and represented by the line $x$—$x$ of FIG. 4. The assembly 154 is rotatable for tube-bending purposes bodily as a unit about a vertical axis which is spaced from the axis $x$—$x$ and is represented by the line $y$—$y$ in FIG. 4. The mandrels 54 and 56 are eccentrically disposed with respect to their respective assemblies, the amount of eccentricity in each case being equal to the spacing between the two axes $x$—$x$ and $y$—$y$ so that in any angular position of the assemblies 154 and 156, the mandrels will normally assume substantial tangential relationship. By reason of the axially offset condition of the two carriers and of the eccentric disposition of the mandrels with respect to their respective assemblies, rotation of either assembly will cause its respective or associated mandrel to orbit about the other mandrel.

Since the mandrel assembly 156 is mounted on the pivoted arm 70 near the distal end of the latter, it is shiftable for tube-releasing purposes away from the fixed vertical axis $y$—$y$ of rotation of the mandrel assembly 154. When the assembly 156 is thus displaced from its operative tube-bending position, it will not be rotated since rotation thereof would be without useful function.

Although the two mandrels 54 and 56 assume the same horizontal level in the apparatus at all times, the assembly 154 with which the mandrel 54 is associated may be regarded as an upper mandrel assembly since it is actuated or driven by mechanism above the level of the mechanism which actuates or drives the assembly 156. By the same token, the assembly 156 may be regarded as the lower mandrel assembly and this terminology will be adhered to herein.

*The upper mandrel assembly*

The upper mandrel assembly 154 comprises a rotatable mandrel carrier in the form of a pinion hub 160 (see FIG. 4) having an integral pinion 162 formed on its upper portion. The lower end face 164 of the hub 160 is provided with a shallow socket 166. A circular retainer and bearing plate 168 is clamped by screws 170 against the lower end face 164 and such plate has formed therein a bearing opening 172 in register with the socket 166. As shown in FIG. 4, the bearing opening 172 is of less diameter than the socket 166. The mandrel 54 is of cylindrical design and is provided with the previously-described spaced grooves 74 and 76. It also is provided with an enlarged head 174 which is disposed in the socket 166 and is supported upon the plate 168 so that the mandrel projects downwardly through the bearing opening 172. The socket 166 and bearing opening 172 are eccentrically disposed with respect to the axis of rotation x—x so that, as the assembly 154 is rotated in one direction or the other throughout an angle of 180°, the mandrel 54 performs a half-orbit sweep around the axis x—x, as briefly indicated in connection with the description of FIGS. 5, 6 and 7. The pinion hub 160 is formed with an upstanding journal shaft 176 which is suitably journalled in a bearing block 178. The latter is fixedly supported by way of suspension blocks 180 which are connected to the upper level support 36.

*The lower mandrel assembly*

The lower mandrel assembly 156 of which the mandrel 56 forms a part is substantially identical with the upper mandrel assembly 154 although it is inverted in its disposition within the apparatus. Therefore, the description which has been made of the upper assembly 154 will suffice for the lower assembly 156 and the application of identical reference numerals to the corresponding parts in the two assemblies will further assist in an understanding of the assembly 156. The mandrel 56 and the pinion 181 which are associated with and form a part of the lower assembly 156 being exceptions to numeral coordination. The journal shaft 176 of the lower assembly is rotatably supported in a bearing block 182 which is carried or mounted on the distal end region of the swinging arm 70.

The fully retracted position of the arm 70 for mandrel and clamping block separation is, as previously described, determined by the throw of the plunger 94 which is associated with the clamping cylinder CC. The operative or clamping position of the arm 70 for mandrel registration purposes is determined by means of an adjustable limit stop screw 184 (see FIG. 4) which is threaded through a fixed or stationary bracket 186 on a stationary part of the apparatus framework 30.

As best shown in FIGS. 10 and 11, since the eccentricity of each mandrel with respect to its respective assembly is equal to the spacing between the axes x—x and y—y of the two assemblies, when the two assemblies are in their operative tube-bending positions, the vertical axis of the mandrel 54 is coincident with the axis x—x of rotation of the assembly 156, while the vertical axis of the mandrel 56 is coincident with the axis of rotation of the assembly 154. This condition obtains only when the arm 70 is in its advanced position and the two assemblies are in their normal positions of rest preparatory to effecting a tubing bend.

*The upper mandrel-actuating mechanism*

Referring now to FIGS. 4 and 8, rotation of the upper mandrel assembly 154 is effected under the control of a pneumatic cylinder C1 which is suitably mounted on the framework 30 and is operable under the control of a control valve V1 (see FIG. 1). Such control valve is carried on the end standard 32 and has a plunger 190 which is connected to a reciprocable rack 192 in mesh with the pinion 162. The cylinder C1 is provided with ports 194 and 196 at the ends thereof and these ports are respectively connected through fluid lines 198 and 199 to the control valve V1.

The control valve V1 is in the form of a conventional solenoid-actuated valve and no claim is made herein to any novelty associated with it. The valve has been schematically illustrated in FIG. 14 and includes a cylindrical valve casing 200 in which there is axially slidable a spool-type valve body or core 202 the ends of which are piloted as at 204 in a pair of solenoid windings 206 and 208, respectively. Upon energization of the winding 206, the valve core 202 is moved in a direction so that compressed air or other motive fluid issuing from a source line 210 enters the valve casing 200 from whence it flows through the line 198 to cause retraction of the plunger 190 and consequent retractile rotation of the pinion 162. When the pinion is caused to rotate counterclockwise, resultant counterclockwise rotation of the mandrel assembly 154 causes the mandrel 54 to make its orbital sweep about the mandrel 56 for tube-bending purposes, as previously described in connection with FIG. 5. The throw of the plunger 190 is of such extent that full or complete retraction of the rack 192 will effect a 180° orbital movement of the mandrel 54. When the solenoid winding 208 is energized, the valve core 202 will be shifted in the opposite direction within the casing 200 to cause compressed air to flow through the line 199 to advance the plunger 190 and thereby restore the rack 192, the pinion 162 and entire mandrel assembly 154 to their normal positions.

*The lower mandrel-actuating mechanism*

The mechanism for actuating the lower rotatable mandrel assembly 156 is similar to the mechanism which actuates the upper assembly 154 and includes a pneumatic cylinder C2 (see FIG. 4) and a solenoid-actuated control valve V2 (see FIGS. 1 and 14). The valve V2 has solenoid windings 212 and 214 and is connected to the cylinder C2 through fluid lines 213 and 215. The cylinder C2 is operatively connected through a plunger 216 to a reciprocable rack 218 which meshes with the pinion 181 of the mandrel assembly 156. The cylinder C2 is mounted on the proximate end of the swinging arm 70 and thus moves bodily with the latter, as does the rack 218 and the entire mandrel assembly 156, as previously described.

The cylinder C2 and its control valve V2 are substantially identical in their construction and associated operation to the construction and operation of the cylinder C1 and control valve V1 and it is believed, therefore, that the previously rendered description of these latter instrumentalities will suffice for the former. The control valve V2 has been shown in elevation in FIG. 14, but it will be understood that its internal mechanism is the same as that of the control valve V1 which has been described in detail. It is to be noted, however, that in connection with the cylinder C1, the normal position of the rack 192 is its extended position, whereas in connection with the cylinder C2, the normal position of the rack 218 is its retracted position.

MACHINE AUTOMATION

As previously stated, the embodiment of the invention which has been selected herein for illustrative purposes is semi-automatic in its operation. It is within the scope of the invention to render the machine fully automatic, if desired, by suitable modification, or to dispense with all automatic features and actuate the power mechanism of the machine entirely by manual controls. The automatic controls which are illustrated in the drawings consist of two return switches RS1 and RS2 (see FIGS. 4 and 14), the switches being in the form of conventional microswitch assemblies of the normally open contact type. The switch RS1 has a switch plunger 220 which is disposed in the path of movement of an actuating finger 222 on the rack 192 and is engageable thereby as the rack reaches its retracted position. The switch RS2 has a switch plunger 224 which is disposed in the path of movement of an actuating finger 226 on the rack 218 and is engageable thereby as the rack reaches its extended position. As will be described in connection with the circuit diagram of FIG. 14, the closure of contacts of the return switches RS1 and RS2 will serve to cause energization of the return windings 208 and 218, respectively, for returning the racks to their normal positions. By reason of the two switches RS1 and RS2, neither mandrel 54 or 56 may be left in such a position at the end of its 180° orbit about the other mandrel as to cause jamming of the apparatus when the other mandrel is set into motion.

MANUAL MACHINE CONTROLS

In addition to the previously-described control valve V1 which is manipulated by the operator to control the operation of the clamping cylinder CC so as, in turn, to effect opening and closing movements of the clamping blocks 58 and 60, a manually operable switch BS1 is disposed on the upper level support 36 at a region which is conveniently accessible to the operator of the apparatus. This switch serves, when actuated, to initiate tubing bending operations by causing energization of the solenoid winding 206 of the valve V1 to retract the rack 192 and cause the mandrel 54 to move in its orbital path about the mandrel 56, as previously described. The switch BS1 may thus aptly be termed a tube-bending switch and functions, when actuated, to effect an initial bend of the tubing by swinging the forward regions thereof in a counterclockwise direction, looking down over the surface of the table 48, as previously described.

A similar switch BS2 is mounted on the upper level support 36, and upon actuation thereof, causes energization of the solenoid winding 212 of the valve V2 to advance the rack 218 and cause the mandrel 56 to move in its orbital path about the mandrel 54 and effect bending of the tubing by swinging the forward regions thereof in a clockwise direction, looking down over the surface of the table.

The two tube-bending switches BS1 and BS2 are of conventional design and each includes a pair of normally open contacts (see FIG. 14) adapted to become closed momentarily under the control of respective depressible finger plates 230 (see FIG. 1).

OPERATION OF THE APPARATUS

In the operation of the apparatus, in order to produce the tubing core 10 for a heat exchange unit such as has been shown at 20 in FIG. 3, a selected length of dual tubing 22 (see FIG. 9) is applied to the clamping blocks 58 and 60 and to the mandrels 54 and 56 by initially manipulating the two-way valve V in such a manner as to move the handle 114 thereof to its full-line position as shown in FIG. 13 and thus allow fluid to enter the cylinder CC through the port 98. When fluid under pressure flows into the cylinder CC through the port 98, the plunger 94 is retracted and the pivoted arm 70 is caused to swing in such a direction as to move the clamping block 60 away from the fixed clamping block 58 and also displace the mandrel assembly 156 (see FIG. 4) laterally from the axis of the mandrel assembly 154, thus separating the two mandrels 56 and 54. With the blocks and mandrels thus separated, the dual tubing may be applied to the blocks and mandrels in the manner previously described and so that the upper tube length 26 (FIG. 9) moves into register with the grooves 62 in the blocks 58 and 60 and with the annular grooves 74 in the mandrels 54 and 56, while the lower tube length 28 similarly moves into register with the grooves 64 in the blocks and the grooves 76 in the mandrels. At the same time, the operator will swing the hinged gate 130 (see FIGS. 1 and 9) to a position which will allow the tube lengths 26 and 28 to enter the slots 126 and 128 in the tube guide 120, after which the gate 130 will be restored to its normal position so that these tube lengths will be captured within the slots. The tube length 26 also is positioned in the slot 134 of the tube guide 122 and the tube lengths 26 and 28 are caused to straddle the leg 135 of the tube guide 124, as previously described, to hold the tubing in operative register with the clamping blocks 58 and 60 and with the mandrels 54 and 56.

With the tubing thus in position on the table 48, the tubing is slid forwardly and longitudinally to bring the original tubing bend 24 into engagement with the abutment 66 (see FIG. 5). Thereafter, the valve V is manipulated by moving the handle 114 to the dotted-line position of FIG. 13 to effect closure of the clamping blocks 58 and 60 upon the tubing and to move the mandrel assembly 156 toward the assembly 154 so that the mandrels 54 and 56 which are associated therewith move into their normal side-by-side relationship with the dual tubing projecting therebetween, as shown in full lines in FIG. 5.

(The circuit diagram)

Upon closure of the master switch MS (see FIG. 14), current will be supplied to the main lines 13 and 15 and will become available for all electrical operations of the apparatus. To effect the initial tube bend 18 in the tubing 22, the manual tube bending switch BS1 is actuated by depression of the associated finger plate 230, thus closing the normally open contacts of the switch and establishing an electrical circuit which extends from the line 13, through a lead 17, the now closed but normally open contacts of the switch BS1, a lead 19, the winding 206 of the solenoid-actuated valve V1, and a lead 21 back to the line 15. Energization of the winding 206 will serve to actuate the valve V1 so as to admit fluid through the line 193 to the cylinder C1 and cause the rack 192 to become retracted from its normally extended position and thus effect counterclockwise rotation of the pinion 162 and its associated mandrel assembly 154 (as viewed from above). Such counterclockwise rotation of the assembly 154 will effect orbital movement of the mandrel 54 about the mandrel 56 throughout an angle of 180° to effect the initial tube bend 18, as previously described.

As the rack 192 approaches its retracted position, the actuating finger 222 which is carried thereby, will engage the switch plunger 220 of the return switch RS1 and close the normally open contacts thereof, thus establishing a circuit from the line 13, through a lead 21, the winding 208 of the valve V1, a lead 23, the now closed but normally open contacts of the switch RS1, and a lead 25 back to the line 15. Energization of the winding 208 will effect reversal of the movement of the rack 192 to restore the same to its normal extended position and during such rack return, the pinion 162 and the mandrel assembly 154 will rotate in a clockwise direction while the mandrel 54 will orbit in a reverse direction about the mandrel 56 and assume its initial or original starting position.

As soon as the mandrel 54 is restored to its initial position, the operator will effect separation of the clamping blocks 58 and 60 and the mandrels 54 and 60 and then shift the tubing forwards until the first bend strikes the abutment 66. Thereafter, the blocks and mandrels will be moved together again and then the operator will depress the finger plate 230 of the tube bending switch BS2 so as to establish a circuit from the line 13, through the lead 25, the now closed but normally open contacts of the switch BS2, a lead 27, the winding 212 of the solenoid valve V2, and a lead 29 back to the line 15. Energization of the solenoid winding 212 will cause fluid under pressure to be admitted through the fluid line 213 to the cylinder C2 so as to project the rack 218 forwardly and cause the pinion 181 and the mandrel assembly 156 to be rotated in a clockwise direction (as viewed from above) so that the mandrel 56 will orbit about the mandrel 54 throughout 180° and effect a clockwise bend in the tubing, as previously described.

As the rack 218 approaches its advanced position, the actuating finger 226 thereon will engage the switch plunger 224 of the return switch RS2 and close the contacts of this switch so as to establish a circuit leading from the line 13, through a lead 31, the return winding 214 of the solenoid valve V2, a lead 33, the now closed but normally open contacts of the switch RS2, and a lead 35 back to the line 15. Energization of the winding 214 will cause fluid under pressure to be supplied to the cylinder C2 through the fluid line 215 to effect retraction of the rack 218 to its initial position, thus also restoring the mandrel 56 by a counterclockwise orbital sweep about the mandrel 54.

Succeeding tube bends 18 are made in the dual tubing 22 by a repetition of the counterclockwise and clockwise tube bending operations described above, the bends taking place alternately in opposite directions until the initial measured length of dual tubing has been consumed in the process and the tubing core 10 thus formed.

The invention is not to be limited to the exact arrangement of parts shown in the accompanying drawings or described in this specification as various changes in the details of construction may be resorted to without departing from the spirit or scope of the invention. Furthermore, the apparatus which is illustrated and described herein is not necessarily limited to use in connection with the specific type of tubing shown, for example, in FIGS. 5, 6, 7 and 9, since, by the simple expedient of substituting different forms or shapes of mandrels for the mandrels 54 and 56, a wide variety of other tubing may be accommodated and processed. For example, by providing mandrels having single annular grooves therein, a single length of tubing may be provided with reverse bends therein, the bends alternating in serpentine fashion as described in connection with the dual tubing of FIGS. 5, 6, 7 and 9. It is not necessary that the dual tubing be of one piece construction, i.e., fashioned from a single length of tubing having an initial medial reverse 180° hairpin bend. The apparatus is readily adaptable for use in connection with the simultaneous bending of separate lengths of tubing which are fed to the mandrels in parallel relationship. By providing plural annular grooves in the two bending mandrels in excess of two, multiple tubing or tube lengths, without limit as to the number of parallel lengths and whether integral or separate, may be simultaneously bent. By the use of mandrels having contiguous annular grooves, so-called integral dual tubing wherein the tube lengths are in side-by-side relation and connected by a coextensive integral radial web may be accommodated and bent back and forth into serpentine configuration. For these reasons, the term "dual tubing" as employed herein throughout the specification and claims is to be construed as to include parallel tube lengths which are in excess of two, whether these tube lengths be integral by reason of their continuity in a single tube or by reason of their interconnection by webs or the like. Stated otherwise, the dual tubing which is referred to in the claims may be regarded as intended to cover any two tube lengths which are operated upon by the mandrels, whether these two tube lengths be the only lengths undergoing bending or whether they be bent along with the simultaneous bending of additional tube lengths. Still further, it is to be understood that it is not necesary that the two mandrels 54 and 56 be caused to orbit, each around the other, throughout the full 180° extent described herein. Bending of the tubing to a lesser degree to produce serpentine tubing in which the straight reach sections between bends diverge or converge is also contemplated. Therefore, only insofar as the invention has particularly been pointed out in the accompanying claims is the same to be limited or restricted.

Having thus described the invention what I claim as new and desire to secure by Letters Patent is:

1. In an apparatus for simultaneously producing successive parallel reentrant bends in multiple heat exchange tubing of the type that presents elongated, straight, parallel tube lengths, in combination, a pair of mandrel carriers mounted one above the other in spaced relationship for independent rotation about respective vertical axes, a mandrel eccentrically disposed on each carrier and having its axis disposed vertically, the two mandrels extending in opposite directions and side-by-side relationship so as to overlap each other and being adapted to receive therebetween for bending purposes the parallel tube lengths, and means for selectively rotating said carriers, each to the exclusion of the other, selectively in opposite directions throughout a predetermined degree to cause the mandrel of the rotated carrier to orbit around the mandrel of the other carrier and effect simultaneous bends in the tube lengths.

2. An apparatus as set forth in claim 1 and wherein one of the carriers is shiftable bodily and substantially radially with respect to the vertical axis of the other carrier toward and away from said axis for mandrel separation purposes.

3. In an apparatus for simultaneously producing successive parallel reentrant bends in multiple heat exchange tubing of the type that presents elongated, straight, parallel tube lengths, in combination, a fixed framework, a first mandrel carrier mounted on said framework for rotation about a vertical axis, a carriage movably mounted on said framework, a second mandrel carrier mounted on said carriage for rotation about a vertical axis and movable bodily with the carriage, a mandrel permanently secured to and eccentrically mounted on each carrier and having its axis extending vertically, said mandrels projecting in opposite directions, said carriage being movable between an operative advanced tube-bending position wherein the two mandrels assume tube-engaging positions of close proximity and side-by-side relationship and an inoperative tube-releasing position wherein the two mandrels are widely separated, means for independently rotating each carrier in one direction through an angle of 180° to cause the mandrel carried thereby to describe an orbital path of movement about the other mandrel whereby a length of multiple tubing interposed between the mandrels will have its parallel tube lengths simultaneously wrapped by the orbiting mandrel about the other mandrel in the direction of orbiting, and means for moving said carriage between its advanced and its retracted positions.

4. In an apparatus for simultaneously producing successive parallel reentrant bends in multiple heat exchange tubing of the type that presents elongate, straight, parallel, closely-spaced tube lengths, in combination, a fixed framework, a first mandrel carrier mounted on said framework for rotation about a vertical axis, a carriage movably mounted on said framework, a second mandrel carrier mounted on said carriage for rotation about a vertical axis and movable bodily with the carriage, a mandrel eccentrically mounted on each carrier and having its axis extending vertically, said carriage being movable between an operative advanced tube-bending position wherein the two mandrels assume tube-engaging positions of close proximity and side-by-side relationship and an inoperative tube-releasing position wherein the two mandrels are separated, said mandrels being adapted to receive therebetween for bending purposes the parallel tube lengths of the tubing, a fixed clamping block mounted on said framework, a cooperating clamping block on the carriage and movable bodily therewith toward and away from the fixed clamping block into and out of clamping position respectively, said clamping blocks being adapted to receive therebetween for clamping purposes the parallel lengths of said tubing, means for independently rotating each carrier in one direction through an angle of 180° to cause the mandrel carried thereby to describe an orbital path of movement about the other mandrel whereby a length of multiple tubing interposed between the mandrels will have its parallel tube lengths simultaneously wrapped by the orbiting mandrel about the other mandrel in the direction of orbiting, and means for moving said carriage between its advanced and its retracted positions.

5. In an apparatus for simultaneously producing successive parallel reentrant bends in multiple heat exchange tubing of the type that presents elongated, straight, parallel tube lengths, in combination, a fixed framework including a horizontal working table along which the multiple tubing is adapted to be slid endwise and longitudinally, means establishing a tube bending station adjacent to said table for receiving the tubing as it is slid endwise along the table and to the station, an upper rotatable mandrel carrier at said station and presenting a downwardly facing end face, a lower rotatable mandrel carrier at said station and presenting an upwardly facing end face in opposition to and spaced from said downwardly facing end face, a mandrel projecting downwardly from said upper end face, a mandrel projecting upwardly from said upper end face, the two mandrels being eccentrically disposed on their respective carriers and extending in side-by-side parallel relationship and overlapping each other, the mandrels being adapted to receive the tubing therebetween in the overlapping region of the mandrels for tubing-bending purposes, and means for independently rotating each carrier independently of the other carrier in one direction to cause the mandrel carried thereby to describe an orbital path of movement about the mandrel of the other carrier and wrap the interposed tube lengths about the latter mandrel.

6. In an apparatus for simultaneously producing successive parallel reentrant bends in multiple heat exchange tubing of the type that presents elongated, straight, parallel tube lengths, in combination, a fixed framework including a horizontal working table along which the tubing is adapted to be slid endwise and longitudinally, means establishing a tube bending station adjacent to said table for receiving the tubing as it is slid endwise along the table and to the station, an upper rotatable mandrel carrier at said station and presenting a downwardly facing end face, a lower rotatable mandrel carrier at said station and presenting an upwardly facing end face in opposition to and spaced from said downwardly facing end face, a mandrel projecting downwardly from said upper end face, a mandrel projecting upwardly from said upper end face, the two mandrels being eccentrically disposed on their respective carriers and extending in side-by-side parallel relationship and overlapping each other, the mandrels being adapted to receive the tubing therebetween in the overlapping region of the mandrels for tubing-bending purposes, an upper rotatable mandrel carrier at said station and presenting a downwardly directed end face, a lower rotatable mandrel carrier at said station and presenting an upwardly directed end face, one of said carriers being independently rotatable about a fixed vertical axis, the other carrier being independently rotatable about a laterally shiftable vertical axis, means for shifting said other carrier between an advanced operative position wherein the axis of the mandrel carried thereby is coincident with the axis of rotation of said one carrier and the axis of the mandrel carried by the one carrier in coincident with the axis of rotation of the other carrier and the two mandrels assume substantially tangential relationship between an advanced tube-bending position and a retracted position of tube release, a mandrel projecting vertically downwardly from said downwardly directed end face at an eccentric region thereof, a mandrel projecting upwardly from said upwardly directed end face at an eccentric region thereof, the axes of said carriers, when said other carrier is in its advanced position, being spaced apart a distance equal to the eccentricity of each mandrel on its respective carrier, the diameters of said mandrels being equal, the two mandrels extending in side-by-side overlapping relationship when said other carrier is in its advanced position and being adapted to receive the parallel tube lengths therebetween for simultaneously bending thereof, and means for rotating each carrier independently of the other carrier in opposite directions respectively when the other carrier is in its advanced position, to cause the mandrel carried by the carrier so rotated to describe an orbital path of movement about the mandrel of the other carrier and simultaneously wrap the interposed tube lengths about the latter mandrel.

7. In an apparatus for simultaneously producing successive parallel reentrant bends in multiple heat exchange tubing of the type that presents elongated, straight, parallel tube lengths, in combination, a pair of mandrel carriers mounted, one above the other, in spaced relationship for independent rotation about respective vertical axes, a mandrel eccentrically disposed on each carrier and having its axis disposed vertically, the two mandrels extending in side-by-side parallel relationship so as to overlap each other and being adapted to receive therebetween for bending purposes the parallel lengths of the tubing, a pinion on each carrier, racks reciprocable in opposite directions and operatively connected to the pinion respectively, a reversible motor type device for each rack operatively connected to its associated rack and having associated therewith a first electrically energizable winding operable upon energization thereof to cause the advancement of the associated rack and effect rotation of the associated carrier in one direction throughout a predetermined degree to cause the mandrel associated with said associated carrier to orbit around the mandrel of the other carrier and effect simultaneous bends in the tube lengths, each motor type device also having associated therewith a second electrically energizable winding operable upon energization thereof to cause retraction of the associated rack and effect rotation of the associated carrier in the opposite direction to restore the associated mandrel to its initial position, and means for selectively energizing said windings.

8. In an apparatus for bending tubing into serpentine shape, in combination, a fixed framework, a first mandrel carrier mounted on said framework for rotation about a vertical axis, a carriage movably mounted on said framework, a second mandrel carrier mounted on said carriage for rotation about a vertical axis and movable bodily with the carriage, a mandrel eccentrically mounted on each carrier and having its axis extending vertically, said mandrels projecting in opposite directions, said carriage being movable between an operative advance tube-bending position wherein the two mandrels assume overlapping tube-engaging positions of close proximity and side-by-side relationship and an inoperative retracted position wherein the two mandrels are widely separated for tubing withdrawal purposes, said mandrels being adapted to receive the tubing therebetween for bending purposes, a fixed clamping block mounted on said framework, a cooperating clamping block on the carriage and movable bodily therewith toward and away from the fixed clamping block into and out of tubing-clamping position, means for independently rotating each carrier in one direction through an angle of 180° to cause the mandrel carried thereby to describe an orbital path of movement about the other mandrel whereby a length of tubing interposed between the mandrels will be wrapped by the orbiting mandrel about the other mandrel in the direction of orbiting, yieldable means for moving said carriage between its advanced and its retracted positions, and an abutment on said framework movable between an operative advanced position wherein it is disposed in the path of movement of the carriage and an inoperative retracted position wherein it is out of the path of movement of the carriage, said abutment when in its operative advanced position being engageable by the carriage to prevent movement of the latter to its fully retracted position and serving to maintain the carriage in a position wherein the two mandrels are slightly separated for tubing releasing pruposes.

References Cited by the Examiner
UNITED STATES PATENTS

| | | | |
|---|---|---|---|
| 2,453,868 | 11/48 | Shaw | 153—46 |
| 2,454,290 | 11/48 | Payne | 153—46 |
| 2,565,940 | 8/51 | Armstrong et al. | 153—45 |

CHARLES W. LANHAM, *Primary Examiner.*

WILLIAM J. STEPHENSON, *Examiner.*